Sept. 19, 1961 H. E. TREKELL 3,000,223

GYRO INTEGRATOR

Filed July 20, 1960 3 Sheets-Sheet 1

INVENTOR.

HAROLD E. TREKELL

BY Richard E. Hosley

HIS ATTORNEY

GYRO INTEGRATOR

Filed July 20, 1960 3 Sheets-Sheet 2

*INVENTOR.*
HAROLD E. TREKELL
*BY* Richard E. Hosley
HIS ATTORNEY

Sept. 19, 1961  H. E. TREKELL  3,000,223
GYRO INTEGRATOR

Filed July 20, 1960  3 Sheets-Sheet 3

INVENTOR.
HAROLD E. TREKELL
BY Richard E. Hosley
HIS ATTORNEY

United States Patent Office 3,000,223

Patented Sept. 19, 1961

3,000,223

GYRO INTEGRATOR

Harold E. Trekell, Wakefield, Mass., assignor to General Electric Company, a corporation of New York Filed July 20, 1960, Ser. No. 44,130
7 Claims. (Cl. 74—5.4)

The present invention relates to gyroscopic devices and more particularly to a gyroscopic device of a type wherein a torque proportional to a quantity being measured is applied to a universally mounted gyroscope, causing precession of the gyroscope at a rate proportional to the quantity. To obtain an integrated output, the gyro is connected to drive a register mechanism of the cyclometer or other suitable type. While the gyroscopic device of the present invention may be used to measure and integrate the output of any sensing device having a torque output, it is especially useful in obtaining an integrated output of mass rate flowmeters of the type disclosed and claimed in Jennings Patent 2,714,310, one such application having unique compensation features being disclosed in Cleveland Patent 2,914,945, both of said patents being assigned to the same assignee as the present invention.

For some flowmeter applications a complicated mechanical linkage having a number of joints and connections is required to transmit the signal torque from the internal flowmeter reaction turbine to the external integrating gyroscope. For such applications the friction in the linkage produces a torque which combines with the signal torque being measured and produces an undesired error in the output of the gyroscope. For that reason it is desirable to eliminate the effect of friction in the signal torque transmitting linkage in order to improve the accuracy of the instrument.

Accordingly, it is an object of my invention to provide a gyro integrator which is reliable, relatively inexpensive to construct and has improved accuracy.

It is a further object of my invention to provide a gyro integrator and measuring device having a simple, yet effective, arrangement for eliminating the effect of friction in the linkage adapted to transmit torque from a sensing device to the gyroscope.

Other objects and advantages of my invention will become apparent as the following description proceeds.

Briefly, in accordance with my invention, I provide a gyro integrator having means to apply about the minor axis of a universally mounted gyro through a linkage mechanism a signal torque proportional to the quantity being integrated to cause precession of the gyroscope about its major axis. To eliminate the effect of friction and other error in the signal torque transmitting linkage, I provide an arrangement for applying periodic reversing torques to the gyroscope about its major axis during precession of the gyroscope. This causes an oscillatory movement of the gyroscope about its minor axis, and the oscillatory motion is reflected into the connected signal torque linkage. Because of the oscillatory motion of the linkage, the torque error due to the friction in the linkage is alternately positive and negative relative to the signal torque and this, in turn, causes the precession speed of the gyro to be alternately greater and less than the correct speed corresponding to the signal torque. Since the average gyro precession speed is correct, the integrated output is correct and the effect of friction torque is thus eliminated.

For a more detailed description of the present invention, reference should now be made to the following description taken in connection with the accompanying drawings in which.

Figure 1:
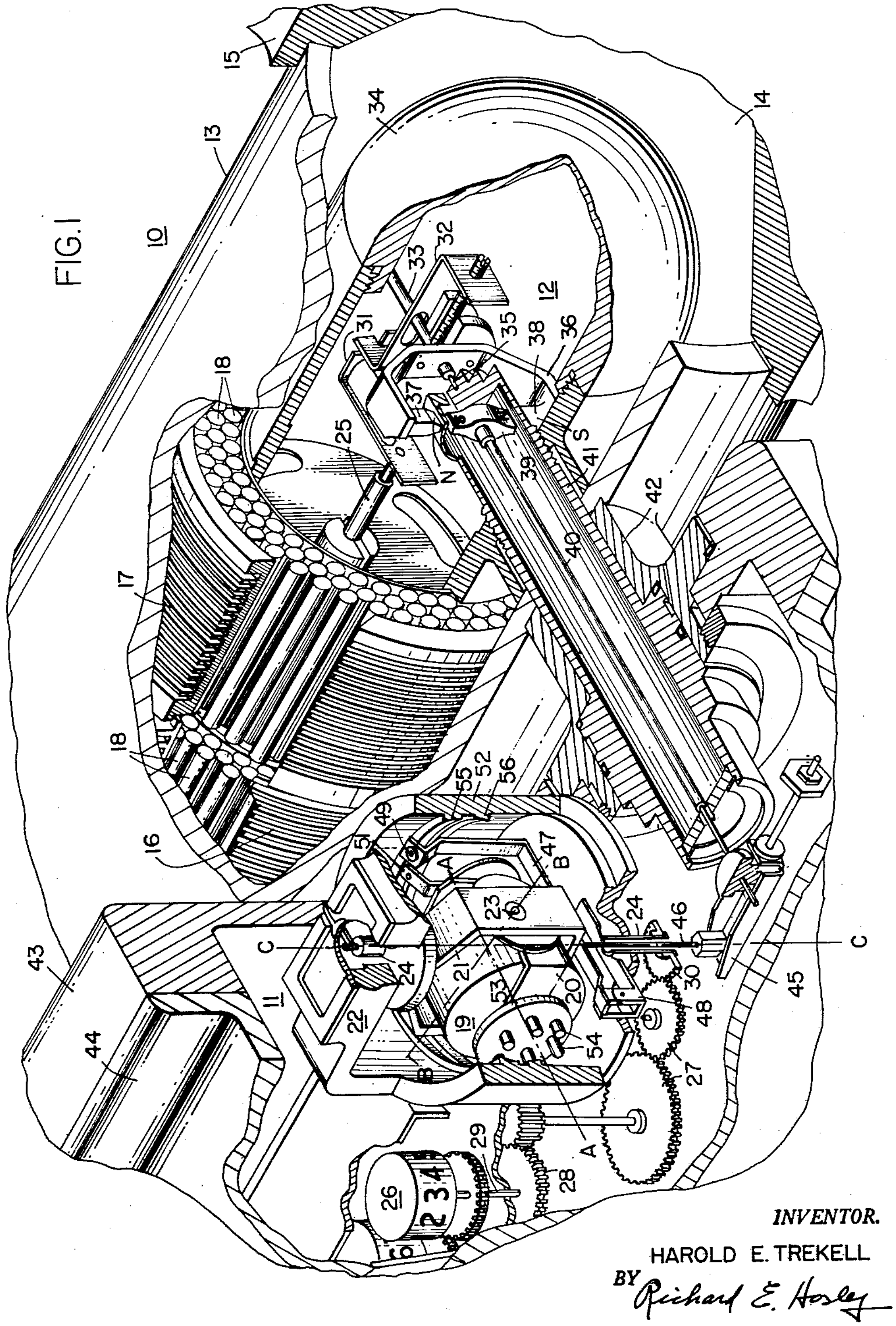
FIG. 1 is a fragmentary perspective view, partly in section, of a gyro-integrating mass flowmeter embodying my invention for eliminating the effect of friction in the linkage connecting the reaction turbine of the flowmeter to the integrating gyroscope.

Referring now to the drawings and particularly to FIG. 1, the present invention is shown embodied in a gyro-integrating mass flowmeter of the general type disclosed in Cleveland Patent 2,419,945. This flowmeter comprises a flow-sensing device indicated generally at 10 and a gyro-integrating device indicated at 11, the flow-sensing device and the gyro-integrating device being mechanically coupled through a torque-transmitting linkage indicated generally at 12.

The flow-sensing device comprises a cylindrical housing 13 adapted to be inserted in a fluid conduit 14 by means of flange couplings, one of which is shown at 15. Mounted for rotation within the housing 10 about an axis coincident with the axis of the housing are an impeller 16 and a turbine 17, the turbine being mounted in downstream relation with respect to the impeller and the axes of the turbine and impeller being collinear. The arrangement of the turbine and impeller is such that fluid flowing through the fluid conduit 14 passes through tubular members 18 carried on the outer peripheries of the turbine and impeller members. These tubular members 18 form fluid flow passages which are linear and parallel with the axes of the turbine and impeller members, this feature being disclosed and claimed in a copending application of Richard H. Cornell, Serial Number 568,354, filed February 28, 1956, now Patent No. 2,948,150 issued August 9, 1960 and assigned to the same assignee as the present invention. Impeller 16 is driven at a constant speed by a synchronous motor (not shown) so that fluid flowing through the tubular members 18 on the impeller has imparted to it a uniform angular velocity. The angular momentum imparted to the fluid by the impeller is removed when the fluid passes through the tubular members 18 on the turbine causing the turbine to experience a torque which is proportional to the mass rate of flow of the fluid through the flow-sensing device. This general axial flow type of mass flowmeter is disclosed and claimed in Jennings Patent 2,714,310 to which reference may be made for further description of the principle of operation involved.

The integrating gyroscope, or gyro, indicated generally at 11 is used to integrate the output of the flow-sensing device 10 in order to obtain an indication of the total mass of fluid flowing through the flow-sensing device. The integrating gyro comprises a gyro rotor 19 carried in a frame 20, the frame, in turn, being rotatably supported in a gimbal 21 which is pivotally mounted on a fixed support 22 so as to provide a universal mounting of the gyro with two degrees of freedom. The frame 20 is mounted on trunnions, one of which is shown at 23, supported in bearings carried by gimbal 21 so that the spin axis AA of the gyro rotor 19 is at right angles to the minor gyro axis BB passing through trunnions 23. The gimbal 21 is rotatably mounted by means of upper and lower trunnions 24 carried by bearings in support 22 so that the gimbal is free to rotate about a vertical major axis of the gyro CC passing through trunnions 24 which is perpendicular to the minor axis BB. This type of gyro suspension which permits universal movement of the gyro is sometimes referred to as a cardan suspension, which is well known in the art. The gyro rotor 19 is driven by a constant speed of an electric motor preferably a synchronous motor energized from the same source of alternating current as the synchronous motor driving the impeller of the flowmeter to obtain frequency compensation features disclosed and claimed in Cleveland Patent 2,914,945. A showing of the gyro motor has been omitted for the purpose of clarity.

The torque output of the flow-sensing device is transmitted from shaft 25 connected to and rotatably supporting the turbine 17 through the linkage 12 in such a manner that the torque is applied about the minor axis BB of the gyro to cause precession of the gyro about the major axis CC at a speed which is directly related to the applied torque in accordance with the well-known laws of gyroscopic precession. In this way the turbine torque is directly related to the gyro precession speed which then becomes a measure of the mass rate of flow of fluid through the flow-sensing device. In order to obtain an integrated output, the gyro is mechanically coupled to a cyclometer type of counter 26 through spur gearing 27 which interconnects a pinion 28 on the counter input shaft 29 with a pinion 30 connected to the lower trunnion 24 of the gyro.

Referring to the details of the linkage 12 that interconnects the turbine and gyro, there is connected to the turbine shaft 25 a crank arm 31, the end of which engages the outer end of another crank arm 32 which is fixed to a rotatable shaft 33 mounted within the streamlined bracket 34 of the flow-sensing device and extending crosswise thereof. The ends of the shaft 33 are supported in bearings, one of which is shown at 35, and the shaft carries a C-shaped yoke member 36 which is attached to the shaft so as to be rotatable therewith. Projecting inwardly from the extremities of the C-shaped member 36 are two permanent magnets 37 and 38 which form the part of the magnetic coupling in the linkage system which is utilized to transmit the turbine torque outside of the flowmeter housing 13 without the need for a seal to prevent leakage of fluid. The other part of the magnetic coupling comprises another permanent magnet 39 connected to the end of a rotatable shaft 40 mounted for rotation within the nonmagnetic tubular support 41 by suitable bearings (not shown). The permanent magnets 37, 38, and 39 are polarized as shown so that the poles of the magnet 39 are attracted to and follow the rotating movement of the magnets 37 and 38, and in this way the rotation of the shafts 25 and 33 is translated into a corresponding rotation of shaft 40. The tubular member 41 conveniently passes through one of two tubular supporting members 42 used to connect the cylindrical housing 10 of the flowmeter to a casing 43 which, together with a cover member 44, encloses the integrating gyro 11, the cyclometer counter 26, and the drive motor for the impeller 16. The inner end of the shaft 40 projects into the casing 43 and carries at its inner end a crank arm 45, the end of which engages the lower end of a push rod 46 extending upwardly through the hollow lower trunnion 24 of the gyro along axis CC. The upper end of the push rod 46 bears against the under side of an L-shaped lever 47, one end of which is pivoted on a support 48 connected to and rotatable with the gimbal 21. The other end of the link 47 carries a pin 49 which engages a bearing member 50 connected to an arm 51 mounted on the gyro frame 20. With this arrangement upward movement of the push rod 46 applies torque to the gyro about minor axis BB regardless of the position of the gyro about the major axis CC.

The transmission of the mechanical motion from the turbine shaft 25 to the gyro frame 20 may now be traced. Assuming that the direction of rotation of the impeller 16 is counterclockwise as viewed in FIG. 1, flow of fluid through the flow sensor 10 will cause a counterclockwise deflection of the turbine 17 and the turbine shaft 25. This, in turn, causes the outer end of crank arms 31 and 32 to rise to produce a clockwise rotation of the C-shaped yoke 36 and the magnets 37, 38, and 39. Since magnet 39 is connected to shaft 40, there is a corresponding clockwise rotation of this shaft which produces an upward movement of crank arm 45 and push rod 46. Upward movement of the push rod 46 causes a counterclockwise rotation of lever 47 and an upward movement of the pin 49 which pushes upwardly against bearing plate 50 and thereby applies a counterclockwise torque to the gyro frame 20 about the minor axis of the gyro BB. This, in turn, causes the gyro and the supporting gimbal 21 to precess about the major axis CC at a rate which is proportional to the applied precessing torque. Since the torque applied to the gyro is directly related to the torque output of the turbine 17 of the flow sensor, the rate of precession of the gyroscope becomes a measure of the mass rate of flow of fluid through the flow sensor 10. The integrated output of the gyro representing the total flow of fluid through the flow sensor is indicated by the cyclometer counter mechanism 26.

In order to maintain the spin axis of the gyro rotor 19 in a position in which it is approximately perpendicular to the major axis CC, this being required for gyro accuracy, there is provided an eddy current leveling system of the general type disclosed and claimed in Sinks et al. Patent 2,585,693 which is assigned to the same assignee as the present invention. As best shown in FIG. 1, the eddy current leveling system comprises a cylindrically shaped member 52 which surrounds the gyro and the axis of which passes through the center of suspension O of the gyroscope. The cylindrically shaped member 52 may, as shown, form a part of the gyro supporting member 22. The gyro rotor 19 has a shaft extension projecting through the frame 20 and carries at its outer extremity a disk 53, preferably formed of magnetically permeable material, which carries a plurality of outwardly projecting cylindrical permanent magnets 54 which rotate with the gyro rotor and produce a rotating magnetic field symmetrical with respect to the spin axis of the gyro rotor. For maximum field strength, the outer extremities of these magnets are preferably alternately polarized so as to produce a strong magnetic flux linking the magnets and projecting axially outward therefrom. The member 52 has projecting inwardly toward the gyro a pair of integrally formed conducting rings 55 and 56 formed of electrically conducting material such as aluminum located in inductive relationship with the rotating field produced by the magnets 54. The rotating magnetic field induces a flow of eddy currents in the rings 55 and 56 which, in turn, produce drag torques reacting on the gyro rotor. Any departure of the gyro spin axis from an appoximately level position of perpendicularity with the axis DD (FIG. 3) of the rings 55 and 56 causes an unbalance in the eddy current drag torques so that there is a net torque applied to the gyro about the major axis which, in turn, causes a displacement of the gyro frame 20 about the minor axis in a direction to restore the gyro to the level position, this action being explained in the above-mentioned Sinks et al. patent. In order to provide an additional torque about the major axis CC of the gyro to counteract the friction torque of the cyclometer mechanism 26, the ring 55 is preferably made somewhat wider than the ring 56, this feature being disclosed and claimed in a copending application of Donald S. Cleveland, Serial Number 847,135, filed October 19, 1959, now Patent No. 2,964,954 issued December 20, 1960, this application being assigned to the same assignee as the present invention.

Figure 5:
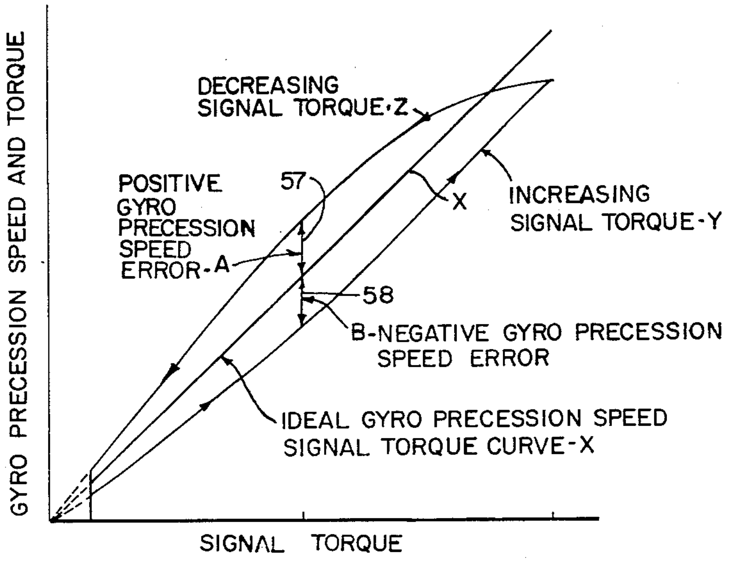
FIG. 5 is another graphical representation showing the relationship between the signal torque and gyroscope precession speed useful in explaining the theory of operation of my invention.

Because the linkage mechanism 12 has a number of joints and relatively movable parts, there is likely to be a considerable amount of friction upon movement of the linkage in transmitting the torque and displacement from the turbine 25 to the gyro frame 20 and this has been found to cause some error in the reading of the integrated output of the flowmeter. This error occurs because of the fact that the friction effect causes a difference to exist between the torque output of the turbine and the torque applied to the gyro so that the rate of gyro precession is not exactly proportional to the torque output of the turbine. Thus, when the flow rate is increasing, causing an increase in the counterclockwise (FIG. 1) torque on the turbine, the friction effect in the linkage opposes the turbine torque so that the net torque applied to the gyro is the difference between the turbine torque and the friction torque. On the other hand, when the flow rate is decreasing, the torque applied to the gyro is the sum of the turbine torque and the friction torque. This means that for increasing flow rates the gyro precession speed is below the correct value and for decreasing flow rates it is higher than the correct value, and this results in error in the measurement output of the gyro. The explanation of this action is clarified by reference to the graphical representation shown in FIG. 5 of the drawing which shows the relationship between the signal torque output of the turbine and the gyro precession speed which corresponds also to the precession torque applied to the gyro about the minor axis. Referring to this figure, the curve X depicts the ideal situation wherein the signal torque and the torque applied to the gyro are the same so that the precession rate of the gyro is an exact measure of the mass rate of flow of the flowmeter. The curve Y shows the error that arises due to friction effect in the linkage when the flow rate is increasing. It will be noted that this curve lies below the ideal curve X, the reason for this being that the friction torque in the linkage is subtracted from the signal torque so that the algebraic sum of these two torques which is applied to the gyro to cause precession is less than the correct value. The curve Z shows the situation when the flow rate is decreasing so that the signal torque and the friction torque are additive and result in a precession torque being applied to the gyro which is greater than the correct value so that the gyro precesses at a speed which is too high. This error may be termed a positive gyro speed error as distinguished from a negative gyro speed error which occurs when the flow rate is increasing, these two errors being indicated respectively by the arrows A and B. According to the present invention, this error caused principally by the friction effect in the torque transmitting linkage and to some extent by changes in lever ratio due to bearing clearances is eliminated by an arrangement which will now be described.

According to the invention, there is provided an arrangement for applying periodic reversing torques to the gyro about the major axis CC during precession of the gyro about that axis. This causes an oscillatory movement of the gyro about the minor axis BB, and this oscillatory movement is reflected in the linkage 12 whereby the effect of friction is substantially eliminated as will be more fully explained hereafter. In the embodiment of the invention shown in FIGS. 1, 2, and 3, the periodic reversing torques which are applied to the gyro about the major axis are generated by the simple and yet effective expedient of tilting the axis DD of the leveling rings 55 and 56 a few degrees from the position of parallelism with the major gyro axis CC. This tilting is indicated by the angle $\alpha$ shown in FIG. 3, this angle being the angle between the major axis CC and the axis DD of the leveling rings 55 and 56. In actual practice a construction has been found satisfactory in which the angle $\alpha$ is approximately three degrees. Since the gyro spin axis tends to remain in a plane perpendicular to the axis of the leveling rings due to the application of eddy current drag torques about the major axis, the result of this arrangement is to produce an oscillation of the gyro frame 20 about the minor axis BB as the gyro precesses about the major axis CC. This oscillatory motion of the gyro causes a corresponding motion or travel of the linkage 12, this being indicated by the graphical representation shown in FIG. 4 of the drawing. Because of the oscillatory motion of the linkage, the effect of the friction torque in the linkage is alternately positive and negative; that is, the friction torque adds to the turbine torque during half of the cycle and subtracts from it during the other half. This means that the algebraic sum of the turbine and friction torque varies cyclically during each 360° of precession of the gyroscope and this, in turn, means that the gyroscope precession rate is alternately greater than and less than the correct value which would be obtained if the precession torque applied to the gyro were exactly the same as the signal torque being measured. The net result is that the positive and negative speed errors during each complete revolution cancel out in the integrated output, and the cyclometer mechanism 26 correctly indicates the total flow of fluid through the flowmeter.

Figure 2:
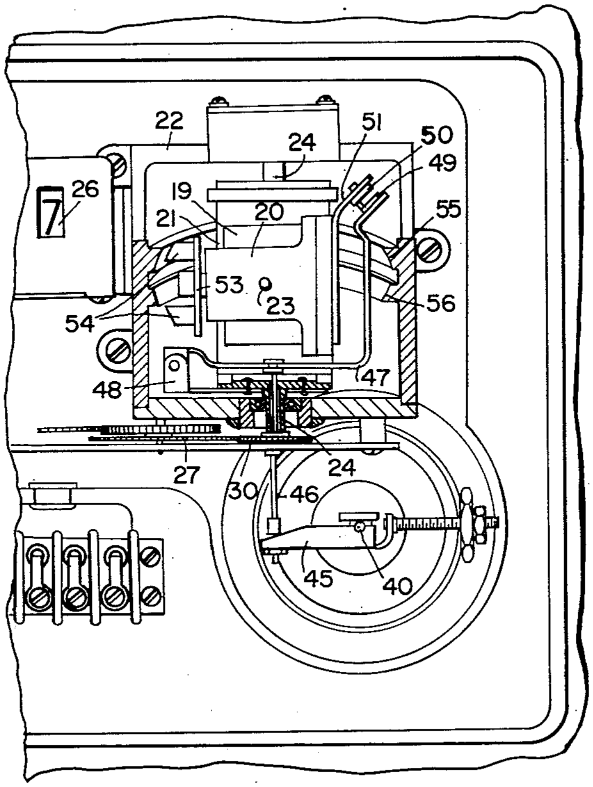
FIG. 2 is a front elevation view, partly in section, showing certain constructional features of the integrating gyroscope.
Figure 3:
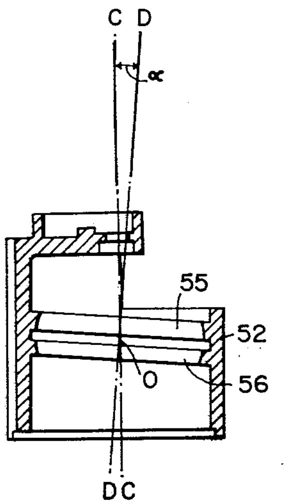
FIG. 3 is a side elevation view showing a detail of the eddy current leveling ring of the gyroscope.
Figure 4:
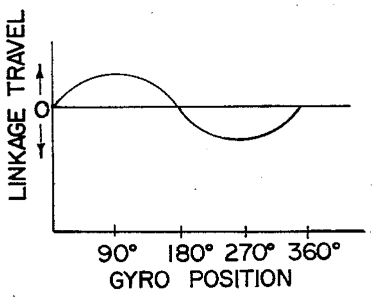
FIG. 4 is a graphical representation showing the relationship between the oscillatory travel of the linkage and the gyroscope position.
Figure 6:
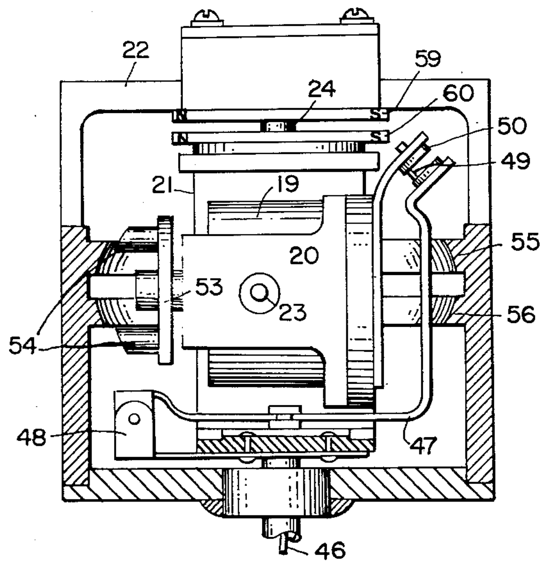
FIG. 6 shows a modified form of the invention embodying a different arrangement for applying periodic torques to the gyroscope to cause oscillation of the linkage.

While the arrangement shown in FIGS. 1, 2, and 3 of the drawing for applying the periodic reversing torques of the gyro to eliminate the effect of friction and other error in the linkage is presently delieved to be one of the best forms of the invention, there are other ways in which a similar result may be accomplished. One such modification is shown in FIG. 6 of the drawing to which reference will now be made. In this modification the leveling rings 55 and 56 are mounted so that their axis is coincident with the major axis of the gyro and therefore produce no oscillatory movement, its sole function being to maintain the spin axis of the gyro normal to the major axis, in other words to maintain the gyro rotor in a level position. The periodic reversing torques in this modification are generated by the use of two permanent bar magnets 59 and 60 which are mounted, respectively, on the gyro support 22 and the top of the gyro gimbal 21, these magnets being polarized adjacent the outer ends thereof as indicated by the polarity marks N and S adjacent the ends of the magnets. When the gyro is in the position shown in FIG. 6 wherein the magnets 59 and 60 are parallel and there are like poles in juxtaposition, there is no torque exerted about the major axis of the gyro. This condition also exists when the gyro has precessed to a position 180° from that shown wherein the juxtaposed magnetic poles are of opposite polarity. However, when the gyro is in some intermediate position, there is a torque applied about the major axis due to repulsion between like poles of the magnets and attraction between unlike poles, this torque varying sinusoidally during precession of the gyro. The direction of this torque alternately becomes positive and negative during rotation of the gyro and this, in turn, causes an oscillation of the gyro frame 20 about the minor axis. This results in elimination of the effect of friction in the linkage 12 in the same manner as explained above.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. A gyroscopic integrating device comprising a gyroscope having a rotor supported in a frame and a gimbal supporting said frame for rotation about a minor axis perpendicular to the rotor spin axis, a support mounting said gimbal for rotation about a major axis perpendicular to said minor axis, input means comprising a linkage mechanism connected to said frame for applying a variable signal torque to said gyroscope about said minor axis to cause precession of the gyroscope and the supporting gimbal about said major axis, output means connected to be driven by said gimbal, means supported by said frame to produce a rotating magnetic field and a relatively fixed eddy current leveling ring surrounding said gyroscope in inductive relationship with said magnetic field acting to maintain the plane of the spin axis perpendicular to the axis of the leveling ring, the axis of said leveling ring being inclined to said major axis to cause oscillatory motion of said linkage during precession of said gyroscope whereby the effect of friction in said linkage is eliminated.

2. A gyroscopic integrating device comprising a gyroscope having a rotor supported in a frame and a gimbal supporting said frame for rotation about a minor axis perpendicular to the rotor spin axis, a support mounting said gimbal for rotation about a major axis perpendicular to said minor axis, input means comprising a linkage mechanism connected to said frame for applying a variable signal torque to said gyroscope about said minor axis to cause precession of the gyroscope and the supporting gimbal about said major axis, means applying periodic torques to said gyroscope about said major axis during precession thereof to cause oscillation thereof about said minor axis, said oscillation being reflected in said connected linkage whereby the effect of friction in said linkage is eliminated.

3. A gyroscopic integrating device comprising a gyroscope universally mounted for two degrees of freedom about major and minor axes, a linkage mechanism connected to apply an input torque to the gyroscope about said minor axis to cause precession thereof about said major axis, leveling means continuously erecting said gyroscope so that the spin axis lies in a leveling plane inclined to a plane perpendicular to said major axis whereby said linkage mechanism undergoes a continuous oscillatory motion during precessional rotation of said gyroscope.

4. A gyroscopic integrating device comprising a gyroscope having a rotor supported in a frame and a gimbal supporting said frame for rotation about a minor axis perpendicular to the rotor spin axis, a support mounting said gimbal for rotation about a major axis perpendicular to said minor axis, input means comprising a linkage mechanism connected to said frame for applying a variable signal torque to said gyroscope about said minor axis to cause precession of the gyroscope and the supporting gimbal about said major axis, output means connected to be driven by said gimbal, leveling means maintaining the spin axis of the gyroscope approximately perpendicular to said major axis, and means applying precession torques to said gyroscope about said major axis comprising a pair of juxtaposed permanent magnets, one of which is attached to said support and the other being mounted to rotate with said gimbal.

5. A gyro integrator comprising a gyro rotor universally mounted on a support for movement about major and minor axes, means connected to apply an input torque to said gyro about the minor axis to cause precession thereof about the major axis, register means driven by said gyro totalizing the precession thereof, and means applying periodic torques to said gyro about the major axis during precession thereof to cause oscillation of the gyro about the minor axis and thereby eliminate the effect of friction in said input means.

6. A gyro integrator comprising a gyro rotor universally mounted on a support for movement about major and minor axes, means connected to apply an input torque to said gyro about the minor axis to cause precession thereof about the major axis, register means driven by said gyro totalizing the precession thereof, leveling means maintaining the spin axis of the gyro approximately perpendicular to the major axis, and means applying periodic reversing torques to said gyro about the major axis during precession thereof to cause oscillation of the gyro about the minor axis.

7. A gyro integrator comprising a gyro rotor universally mounted on a support for movement about major and minor axes, means connected to apply an input torque to said gyro about the minor axis to cause precession thereof about the major axis, register means driven by said gyro totalizing the precession thereof, and leveling means maintaining the spin axis of the gyro in a leveling plane inclined to a plane perpendicular to the major axis whereby the gyro oscillates about the minor axis during precession thereof about its major axis.

References Cited in the file of this patent

UNITED STATES PATENTS

| | | |
|---|---|---|
| 2,914,945 | Cleveland | Dec. 1, 1959 |
| 2,924,978 | Barnes | Feb. 16, 1960 |
| 2,934,960 | Chombard | May 3, 1960 |

FOREIGN PATENTS

| | | |
|---|---|---|
| 1,109,543 | France | Sept. 28, 1955 |